US006965674B2

(12) United States Patent
Whelan et al.

(10) Patent No.: US 6,965,674 B2
(45) Date of Patent: Nov. 15, 2005

(54) SYSTEM AND METHOD FOR PROVIDING WLAN SECURITY THROUGH SYNCHRONIZED UPDATE AND ROTATION OF WEP KEYS

(75) Inventors: Robert Whelan, Kirkland, WA (US); Lamar Van Wagenen, Sandy, UT (US); Roy Morris, Bothell, WA (US); Gilbert Wellisch, Midvale, UT (US)

(73) Assignee: Wavelink Corporation, Kirkland, WA (US)

( * ) Notice: Subject to any disclaimer, the term of this patent is extended or adjusted under 35 U.S.C. 154(b) by 164 days.

(21) Appl. No.: 10/300,324

(22) Filed: Nov. 20, 2002

(65) Prior Publication Data

US 2003/0219129 A1 Nov. 27, 2003

Related U.S. Application Data

(60) Provisional application No. 60/382,107, filed on May 21, 2002, provisional application No. 60/394,999, filed on Jul. 10, 2002.

(51) Int. Cl.[7] .............................. H04L 9/00; H04K 1/00
(52) U.S. Cl. .......................... 380/270; 380/44; 380/46; 380/274
(58) Field of Search ............................... 380/247, 255, 380/261, 270, 273–274, 277, 44, 46, 260; 713/153, 200–201, 178, 168–170; 455/410–411

(56) References Cited

U.S. PATENT DOCUMENTS

| | | | |
|---|---|---|---|
| 5,241,598 A * | 8/1993 | Raith | 380/248 |
| 6,078,663 A * | 6/2000 | Yamamoto | 380/260 |
| 6,167,137 A | 12/2000 | Marino et al. | 380/255 |
| 6,167,514 A * | 12/2000 | Matsui et al. | 713/150 |
| 6,453,159 B1 | 9/2002 | Lewis | 455/411 |
| 6,526,506 B1 * | 2/2003 | Lewis | 713/153 |
| 6,701,435 B1 * | 3/2004 | Numao et al. | 713/168 |

OTHER PUBLICATIONS

International Search Report.
PCT Notification of Transmittal of International Preliminary Examination Report mailed Aug. 2, 2004.

* cited by examiner

Primary Examiner—Hosuk Song
(74) Attorney, Agent, or Firm—Jones Day

(57) ABSTRACT

A system and method are disclosed that overcome deficiencies of prior art IEEE 802.11 WEP key management schemes. Preferred embodiments of the present system and method update WEP keys and rotate transmission key indices in a synchronized manner and on a frequent basis making it impractical for a hacker to gather sufficient network traffic using any one WEP key to decrypt that key and without disrupting communications. Preferred embodiments of the present system and method do not require changes in access point or mobile unit hardware, radio drivers, or firmware and are therefore compatible with existing or legacy network infrastructure or components. The disclosed system and method may be used to facilitate secure communications between one or more access points and one or more mobile units and/or groups of two or more mobile units engaging in peer-to-peer associations.

19 Claims, 6 Drawing Sheets

Overall Key Update and Rotation Entity Relationships

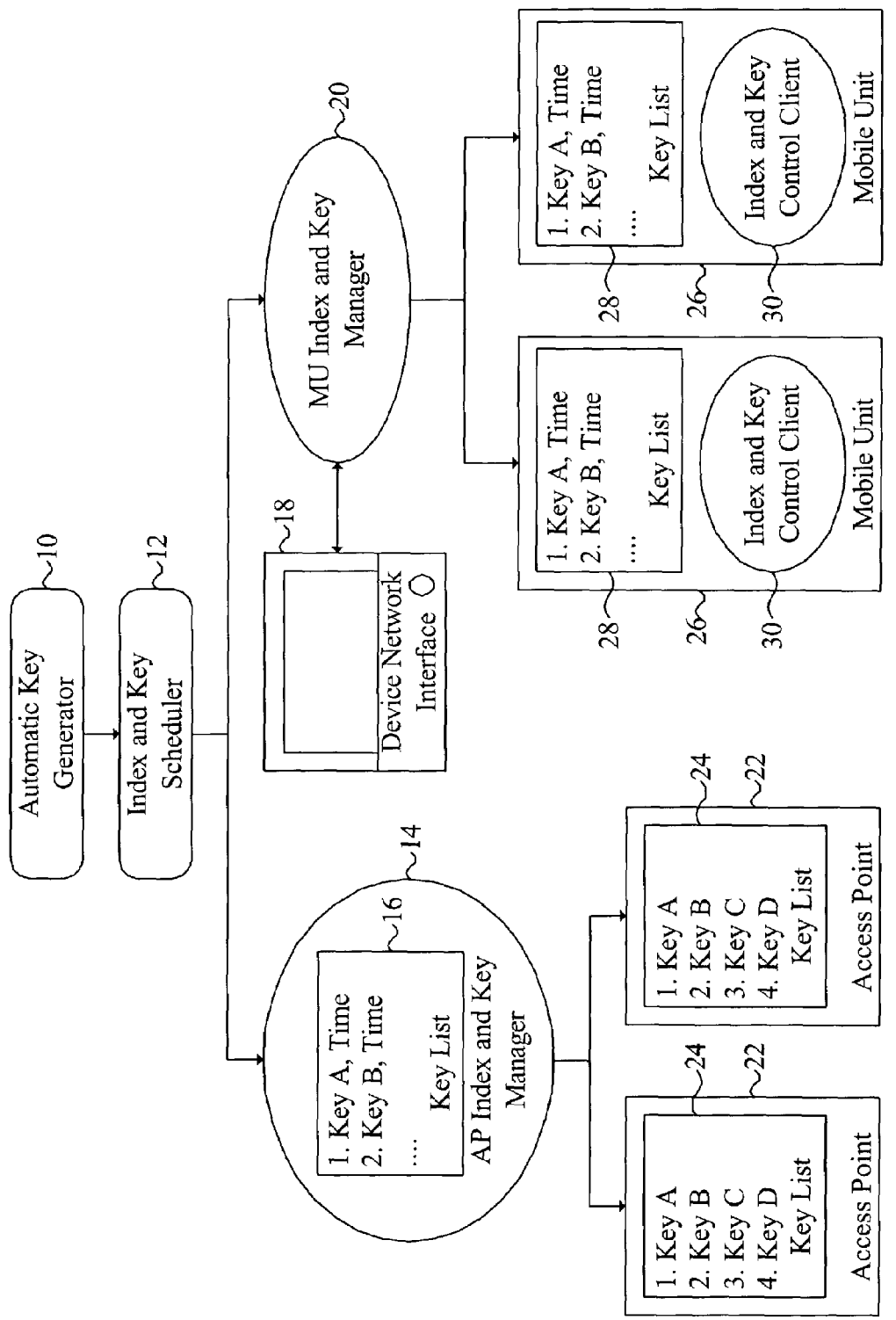
Figure 1. Overall Key Update and Rotation Entity Relationships

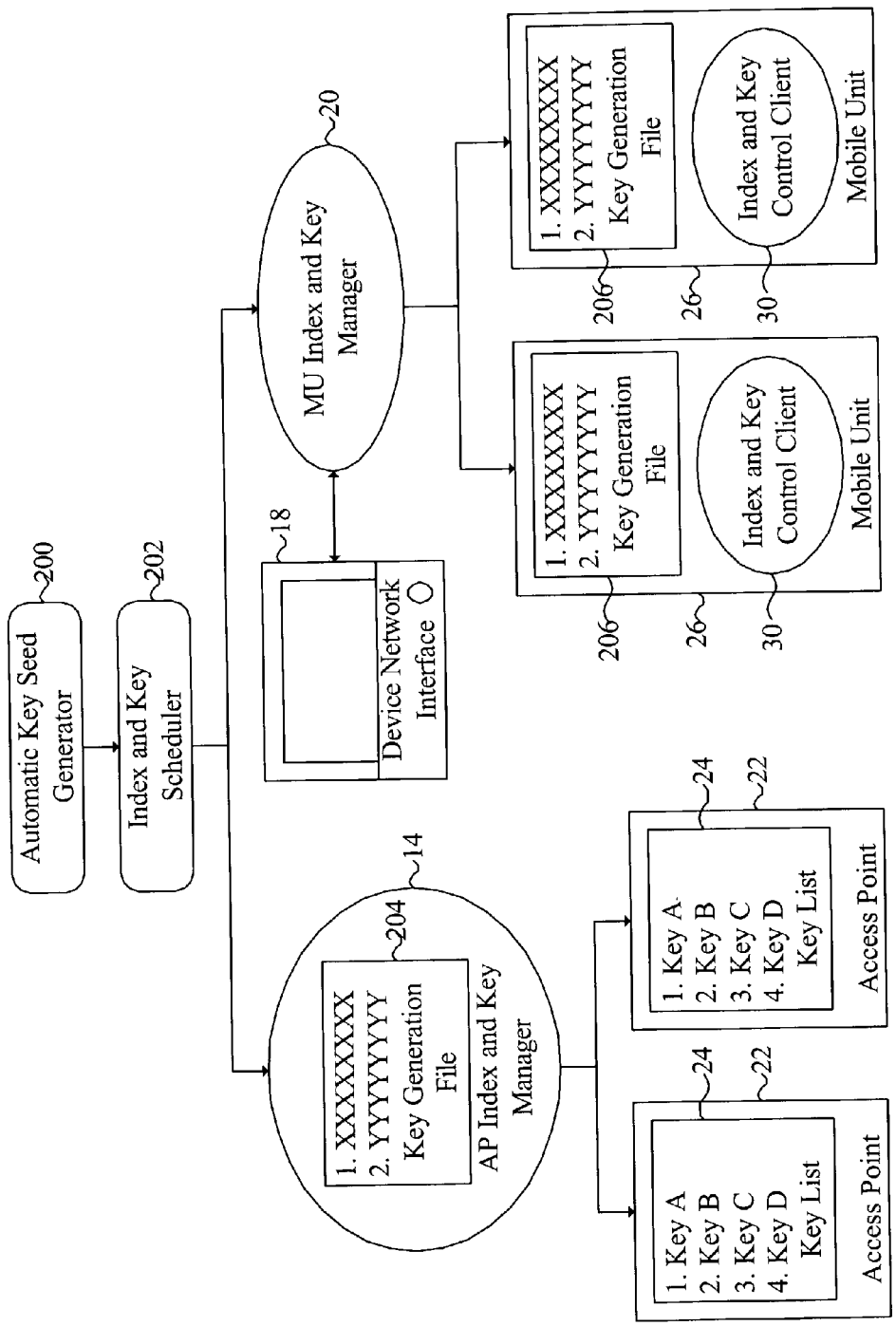
Figure 2. Alternative Key Update and Rotation Entity Relationships

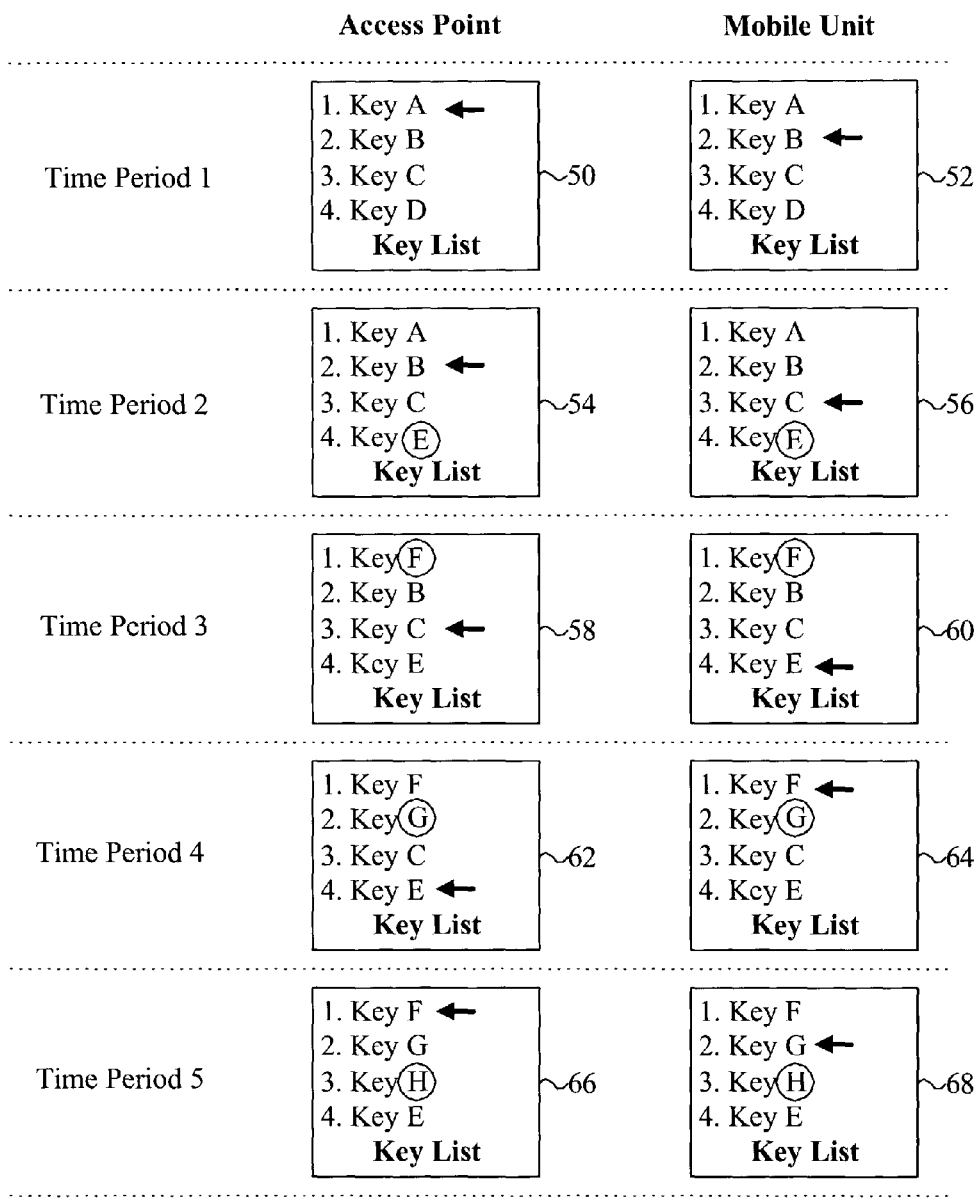
Figure 3. Key Update and Index Rotation Scheme

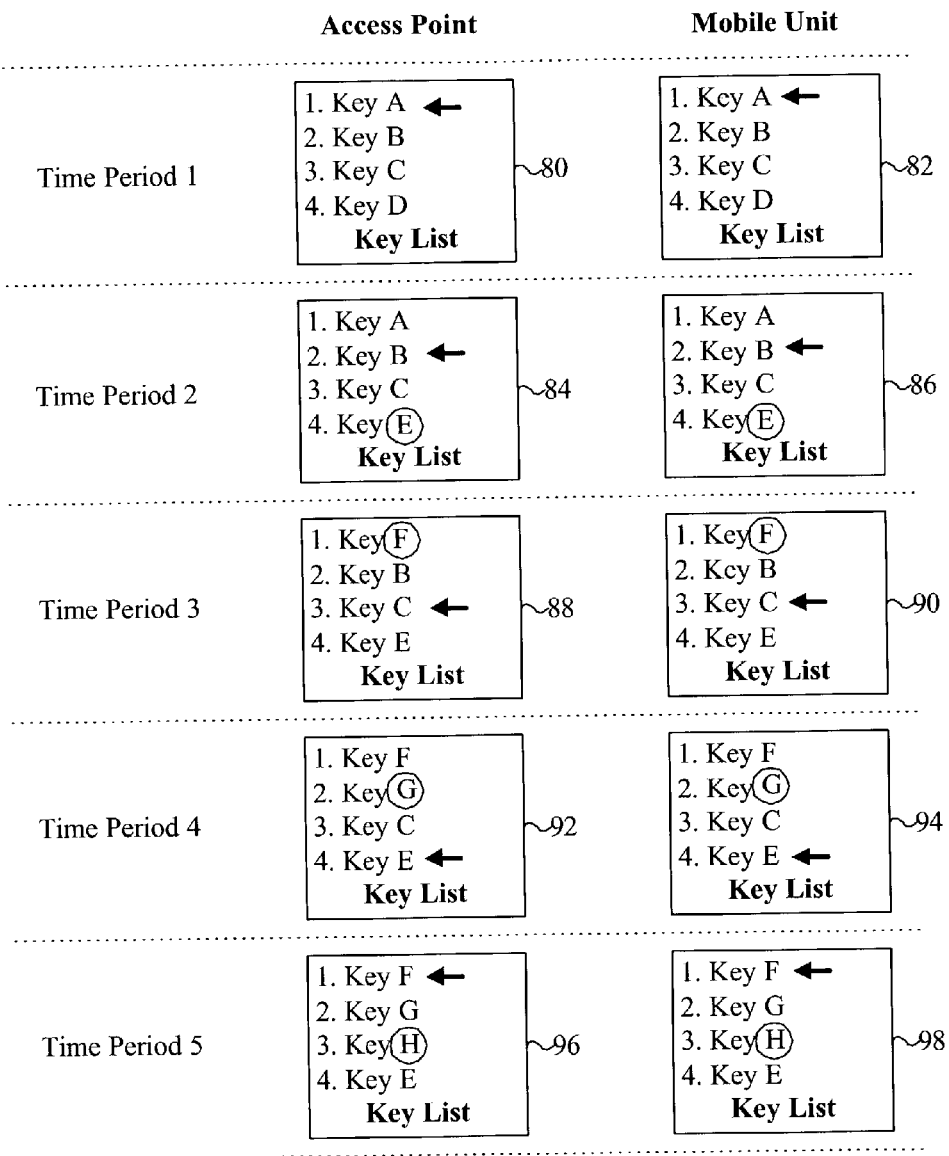
Figure 4. Alternative Key Update and Index Rotation Scheme

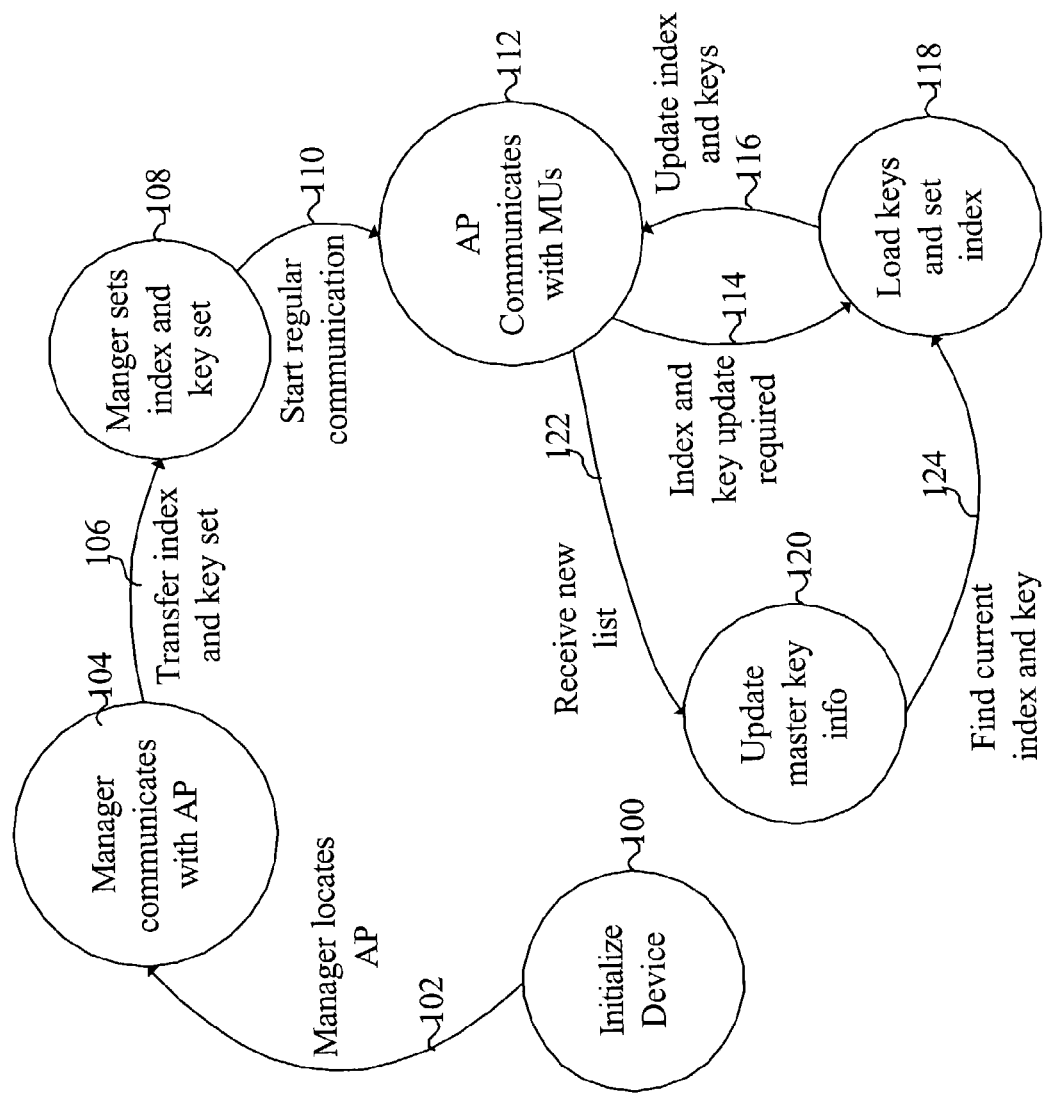
Figure 5. Simplified Access Point Manager State Diagram

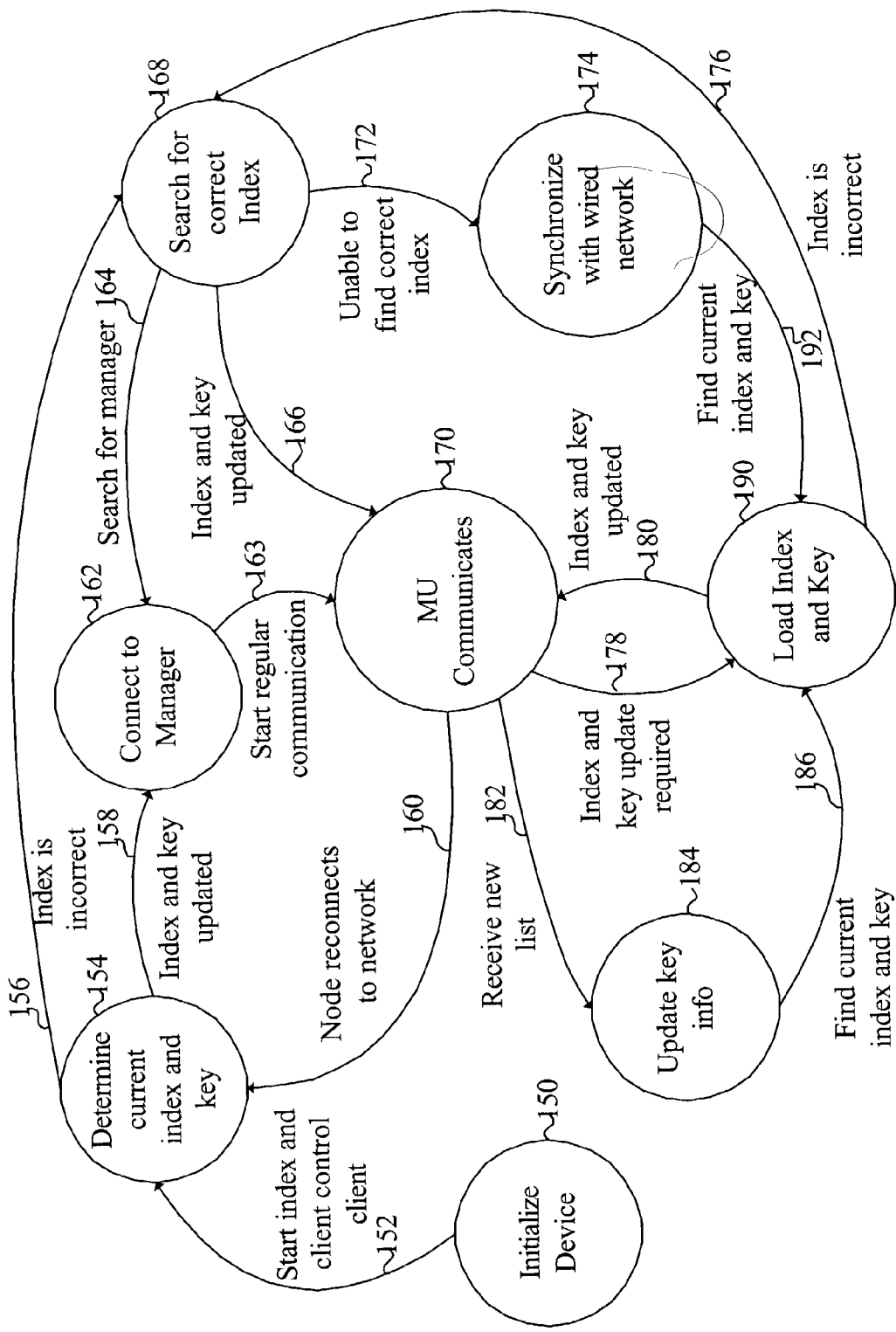
Figure 6. Simplified Mobile Unit State Diagram

SYSTEM AND METHOD FOR PROVIDING WLAN SECURITY THROUGH SYNCHRONIZED UPDATE AND ROTATION OF WEP KEYS

CROSS-REFERENCE TO RELATED APPLICATIONS

This application claims priority of U.S. provisional patent application Ser. No. 60/382,107, filed May 21, 2002, entitled WLAN Security Through the Rotation of WEP Keys, and U.S. provisional patent application Ser. No. 60/394,999, filed Jul. 10, 2002, entitled WLAN Security Through the Rotation of WEP Keys. Each of the above applications is hereby incorporated by reference herein in its entirety and for each of its teachings and embodiments.

FIELD OF THE INVENTION

The present invention relates to the field of Wireless Local Area Network (WLAN) security.

BACKGROUND OF THE INVENTION

WLANs are now in common use in both large and small businesses and home environments with millions of devices now deployed. In a WLAN, one or more base stations or Access Points (AP) bridge between a wired network and radio frequency or infrared connections to one or more mobile stations or Mobile Units (MU). In addition, MUs may communicate on a peer-to-peer basis. The MUs can be any of a wide variety of devices including, laptop computers, personal digital assistants, wireless bar code scanners, wireless point of sale systems or payment terminals, and many other specialized devices. Most WLAN systems used in business environments adhere to the IEEE 802.11 specifications.

The IEEE 802.11 specifications employ the Wired Equivalent Privacy (WEP) protocol to encrypt and decrypt the packets transmitted on the WLAN. The WEP protocol, in effect, acts as an authentication method by assuming that only authorized devices have the correct keys. Unfortunately, the WEP protocol has well known and well documented security deficiencies, which allows an unauthorized person or hacker to determine the WEP encryption key. In AT&T Labs Technical Report TD-4ZCPZZ, "Using the Fluhrer, Mantin, and Shamir Attack to Break WEP," Aug. 6, 2001, Stubblefield et. al., disclose a practical method for determining the WEP key by passive monitoring of communications. The attack takes advantage of the fact that the identifier for the key, or key index, is transmitted in plaintext in the header of each message. The effectiveness of this attack is improved when either: 1) a known piece of information is transmitted, as is the case with an IP ACK, or 2) a message with the same content is transmitted more than once, as is the case in a retransmission following a packet collision. Once hackers obtain the key they can receive and decode messages transmitted on the WLAN or can actively intrude into the WLAN. In either case the hackers are likely to obtain access to sensitive data. To address these problems with WEP key security, three classes of solutions have been proposed to date:

1) use an alternative encryption and authentication protocol;
2) modify the WEP algorithm to remove the vulnerability by limiting the use of a given WEP key; or,
3) use an alternative security mechanism to the WEP protocols.

The IEEE 802.1X amendment to the IEEE 802.1 specifications proposes to limit WEP key reuse by providing for session-based keys and by further supporting alternative security protocols. The IEEE 802.1X amendment overcomes the deficiencies of the WEP protocols by using a secure user authentication scheme (the Extensible Authentication Protocol or EAP; RFC 2284), secure distribution of keys, assigning unique keys for each session and by optionally changing keys within a session. Deployment of these protocols requires an authentication server as well as new hardware capabilities, radio drivers and/or firmware and thus may not be possible with existing mobile units and access points. In addition, the IEEE 802.1X amendments do not address peer-to-peer communications.

The temporal key integrity protocol (TKIP), initially referred to as WEP2, attempts to eliminate the key reuse problem of WEP. The TKIP protocol uses a 128-bit "temporal key" shared among clients and access points. Each access point is, in effect, a "master," distributing temporal keys to the mobile units associating with the access point. The access point authenticates the mobile unit before a temporal key is distributed. TKIP combines the temporal key with the mobile unit's MAC address and adds a 16-octet initialization vector to produce a unique encryption key. This protocol ensures that each entity uses different key streams to encrypt the data. TKIP uses the same RC4 algorithm as WEP, to perform the encryption. TKIP improves on WEP by allowing changes to temporal keys. These changes can be made every so many packets (typically 10,000 to 30,000) or at some time interval (e.g., 15 minutes). This dynamic temporal key updating reduces the primary weakness of WEP. While this algorithm does improve the security of WEP, it requires that the distribution of the temporal key be tightly coordinated between access points and mobile units. Further, the mobile units and access points must have the ability to decrypt the individualized keys used by each communicating entity, which may not be possible with existing 802.11 hardware or software. In addition, the TKIP algorithm does not include provisions for peer-to-peer communications, since access points control the distribution of the temporal keys.

RSA Security, Inc. has proposed an algorithmic modification to the present IEEE 802.11 standards to overcome the inherent weakness in the WEP protocol. This approach is summarized in a white paper, "Wireless LAN upper layer authentication and key negotiation," Jan. 17, 2002 by Andersson (http://www.rsasecurity.com/newsletter/wireless/2002 winter/feature.htm I). This approach effectively uses an authentication protocol at a higher network layer level and a new algorithm to compute the keys used for each packet transmitted to eliminate the known problems with the WEP protocol, particularly the problems associated with collisions, while retaining the use of the RC4 encryption algorithm. While the methods discussed effectively solve the security problem in theory, in practice, deployment of these improved protocols requires new hardware capabilities, radio drivers and firmware and thus may not be compatible with existing mobile units and access points.

Additional alternative approaches to WLAN security, which use other IT available technology, have been proposed. These technologies can include Virtual Private Networks (VPN), proxy servers for packet filtering or address translation, cryptographic challenge-response systems and Public Key Infrastructure (PKI). All of these approaches require the deployment of significant new infrastructure.

One possible approach is to force all WLAN connections to use a virtual private network, typically through a firewall. While this approach employs standard IT industry technology, it requires a significant capital investment, considerable system administration effort and a new VPN connection may need to be established when the MU roams between the coverage area of one AP and that of another. A VPN system of this type is commercially available from Bluesocket communications (www.bluesocket.com). This system works with existing WLAN nodes, but requires the deployment and management of significant new infrastructure.

A related approach is disclosed in EP 1113641 to Moles and Herle. The system described employs a specialized proxy server, which uses an address translation protocol to filter packets transmitted between MUs and other nodes on the wired network or WLAN. While this method effectively prevents unauthorized MUs from intruding into the network, it does not attempt to improve the encryption methods or prevent passive detection and decoding of data using an unauthorized MU. The system architecture requires that all WLAN access points be on a separate sub-network, possibly limiting performance. This approach also does not improve the security for peer-to-peer wireless communications.

Another alternative WLAN authorization or authentication method is disclosed in US 20010048744 to Kimura. This system essentially replaces the 802.11b security standard. The system uses a server to manage the cryptographic authentication of MUs. The server requests permission from a network administrator who must be available to authenticate a new MU. This system requires the network administrator to be available to perform the authorization step. In addition, the system does not attempt to improve the encryption methods used to prevent the passive detection and decoding of data using an unauthorized MU. Further, the scheme requires the deployment and management of significant new infrastructure.

In EP 1178644 to Stenman et. al., a system is disclosed which uses the internet key exchange protocol and public key encryption algorithms to first mutually authenticate MUs and APs and then to securely exchange sessions keys used to encrypt subsequent packets. While this technique both authenticates the MUs and APs and cryptographically protects the transmitted packets, it requires the installation and administration of a certificate authority and other network infrastructure. Further, significant time and data bandwidth is consumed by the protocol for each connection, which is a significant consideration when the MU roams.

SUMMARY OF THE INVENTION

The present invention overcomes the deficiencies of prior art WLAN security schemes through the application of a synchronized key updating and key index rotation system. In a preferred embodiment, the system updates WEP keys and rotates transmission key indices on a frequent basis making it impractical for a hacker to gather sufficient network traffic using any one WEP key to decrypt that key.

In one aspect, the present invention is directed to a system for improved security for wireless local area networks, and comprised of:

a wireless local area network conforming to the IEEE 802.11 family of specifications, the wireless local area network providing wireless communications links for the transmission of data between the two or more communicating entities;

one or more generators for creating pseudorandom WEP encryption keys for the communicating entities; and one or more controllers for synchronously selecting a transmission encryption key index for each communicating entity on a rotating basis from one or more sets of active WEP keys, and updating the one or more sets of active WEP keys.

In another aspect of the present invention, the communicating entities comprise:

one or more access points associating with one or more wired sub-networks; and one or more mobile units.

In another aspect of the present invention, the communicating entities comprise two or more mobile units associating on a peer-to-peer basis.

In another aspect of the present invention, the encryption keys are generated for and synchronized between one or more access points and one or more mobile units engaged in associations.

In another aspect of the present invention, the encryption keys are generated for and synchronized between two or more mobile units engaging in peer-to-peer associations.

In another aspect of the present invention, the controller selecting the active encryption keys for the one or more mobile units is on the mobile units.

In another aspect of the present invention, the controller selecting the active encryption keys for the one or more access points is on one or more servers on the one or more sub-networks.

In another aspect of the present invention, the controller selecting the active encryption keys for the one or more access points is on the access points.

In another aspect of the present invention, a server generates a list of two or more encryption keys, which are distributed to the two or more communicating entities.

In another aspect of the present invention, the active keys for the transmitting entities are selected from the list by the controllers in a staggered pattern, so that the encryption keys are different in each transmission direction, and errors in time synchronization of up to one half of a key change time interval do not disrupt regular communications.

In another aspect of the present invention, a server generates key generation information, which is distributed to the two or more communicating entities.

In another aspect of the present invention, the active keys for the communicating transmitting and receiving entities are selected by the one or more controllers in a staggered pattern, so that the encryption keys are different in each transmission direction, and errors in time synchronization of up to one half key change time interval do not disrupt regular communications.

In another aspect of the present invention, the encryption key updates for the communicating entities are performed at specific dates and times.

In another aspect of the present invention, the encryption key updates for the communicating entities are performed at regular time intervals.

In another aspect of the present invention, the one or more controllers use time offsets to synchronize the key updates in time between the communicating entities.

In another aspect of the present invention, a mobile unit reconnecting to the wireless network can determine the correct encryption keys to use based on the time.

In another aspect of the present invention, a mobile unit reconnecting to the wireless network and unable to synchronize encryption keys is adapted to perform a systematic search for the correct keys based on a key update and rotation algorithm.

In another aspect of the present invention, a mobile unit that has lost synchronization with the changes in encryption keys is adapted to connect to a wired network to regain synchronization.

In another aspect, the present invention is directed to a system for facilitating secure communication, comprising:

a first communicating entity;

a second communicating entity;

at least one wireless communications link for transmitting data between the first and second communicating entities;

one or more generators for creating a plurality of WEP encryption keys that conform to the IEEE 802.11 family of specifications;

a first controller adapted to maintain a first active key set comprising one or more WEP encryption keys, the first active key set comprising some or all of the plurality of WEP encryption keys, the first controller being further adapted to periodically update the keys in the first active key set so that at least one key in the first active key set is replaced; and a second controller adapted to maintain a second active key set comprising one or more WEP encryption keys, the second active key set comprising some or all of the plurality of WEP encryption keys, the second controller being further adapted to periodically update the keys in the second active key set so that at least one key in the second active key set is replaced.

In another aspect of the present invention, the first communicating entity is an access point on a sub-network and the second entity is a mobile unit.

In another aspect of the present invention, the first communicating entity is a mobile unit and the second entity is a second mobile unit.

In another aspect of the present invention, the first active key list and second active key list each includes four WEP encryption keys.

In another aspect of the present invention, the first controller and second controller each update at least one key in their respective active key lists in a synchronized manner.

In another aspect of the present invention, the at least one key replaced by the first controller and the at least one key replaced by second controller are the same key.

In another aspect of the present invention, the plurality of WEP encryption keys are generated from a key seed.

In another aspect of the present invention, at least one of the one or more generators is located on the first communicating entity.

In another aspect of the present invention, at least one of the one or more generators is located on the second communicating entity.

In another aspect of the present invention, the plurality of WEP encryption keys comprises a pre-generated key file, and the keys included in the first active key list and second active key list are selected from the pre-generated key file.

In another aspect of the present invention, the pre-generated key file is periodically updated.

In another aspect of the present invention, a portion of an updated pre-generated key file is the same as a previous pre-generated key file.

In another aspect of the present invention, the portion is approximately one fourth.

In another aspect of the present invention, the updated pre-generated key file indicates a valid start time and date.

In another aspect of the present invention, one or more of the plurality of WEP encryption keys is intended for use with one or more specified applications.

In another aspect of the present invention, one or more of the plurality of WEP encryption keys is intended for use with one or more specified networks.

In another aspect of the present invention, one or more of the plurality of WEP encryption keys is intended for use with one or more specified sub-networks.

In another aspect of the present invention, one or more of the plurality of WEP encryption keys is intended for use with one or more specified communicating entities.

In another aspect of the present invention, one or more of the plurality of WEP encryption keys is intended for use with one or more specified profiles of the one or more specified communicating entities.

In another aspect of the present invention, the first controller maintains a first transmission key index that identifies a WEP encryption key in the first active key set for use in encrypting messages transmitted by the first communicating entity.

In another aspect of the present invention, the second controller maintains a second transmission key index that identifies a WEP encryption key in the second active key set for use in encrypting messages transmitted by the second communicating entity.

In another aspect of the present invention, the first transmission key index and the second transmission key index identify different WEP encryption keys in the first active key list and the second active key list respectively.

In another aspect of the present invention, each key in the first active key list and second active key list has a key position in its respective active key list.

In another aspect of the present invention, the second transmission key index identifies a key having a position in the second active key list that is one ahead of the position in the first active key list of the key identified by the first transmission key index.

In another aspect of the present invention, the key identified by the first transmission key index and the key identified by the second transmission key index have the same key position in their respective active key lists.

In another aspect, the present invention is directed to a system for facilitating secure communication, comprising:

a first communicating entity;

a second communicating entity;

at least one wireless communications link for transmitting data between the first and second communicating entities;

one or more generators for creating a plurality of WEP encryption keys that conform to the IEEE 802.11 family of specifications;

a first controller adapted to maintain and periodically rotate a first transmission key index;

a second controller adapted to maintain and periodically rotate a second transmission key index.

In another aspect, the present invention is directed to a system for facilitating secure communication, comprising:

a communicating entity adapted to communicate with other entities;

at least one wireless communications link for transmitting data between the first communicating entity and the other entities;

one or more generators for creating a plurality of WEP encryption keys that conform to the IEEE 802.11 family of specifications; and a controller adapted to maintain an active key set for the communicating entity comprising one or more WEP encryption keys, the active key set comprising some or all of the plurality of WEP encryption keys, the controller being further adapted to periodically update the keys in the active key set so that at least one key in the active key set is replaced.

In another aspect of the present invention, the controller is adapted to maintain and rotate a transmission key index for the communicating entity.

In another aspect, the present invention is directed to a system for facilitating secure communication, comprising:

a communicating entity adapted to communicate with other entities;

at least one wireless communications link for transmitting data between the communicating entity and the other entities;

one or more generators for creating a plurality of WEP encryption keys for use by the communicating entity that conform to the IEEE 802.11 family of specifications; and a controller adapted to maintain and periodically rotate a transmission key index for the communicating entity. It will be appreciated that the foregoing statements of the features of the invention are not intended as exhaustive or limiting, the proper scope thereof being appreciated by reference to this entire disclosure and to subsequent claims.

BRIEF DESCRIPTION OF THE DRAWINGS

The invention will be described by reference to the preferred and alternative embodiments thereof in conjunction with the drawings in which:

FIG. 1 is a block diagram illustrating one embodiment of the invention;

FIG. 2. is a block diagram illustrating a second embodiment of the invention;

FIG. 3. is a diagram showing a key update and index rotation scheme for certain embodiments;

FIG. 4. is a diagram showing the key update and index rotation scheme for certain other embodiments;

FIG. 5. is a simplified state diagram for an access point manager; and

FIG. 6. is a simplified state diagram for a mobile unit.

DETAILED DESCRIPTION OF THE PREFERRED AND ALTERNATIVE EMBODIMENTS

The following detailed description refers to the accompanying drawings and describes exemplary embodiments of the present invention. Other embodiments are possible and modifications may be made to the exemplary embodiments without departing from the spirit, functionality and scope of the invention. Therefore, the following detailed descriptions are not meant to limit the invention.

Overview of the Embodiments

The present invention applies a synchronized WEP key update and rotation system to improve the security of WLANs. The invention updates the static key set and rotates the transmission key index in a synchronized manner and on a frequent basis making it impractical for a hacker to gather sufficient network traffic using any one WEP key to decrypt that key. In certain embodiments, the present invention only relies on existing capabilities of access points and mobile units and is therefore compatible with existing or legacy network equipment, infrastructure or components. Thus, these embodiments do not require changes in access point or mobile unit hardware, radio drivers, or firmware.

In some embodiments, static WEP key updates and transmission key index rotation are coordinated between a server on the wired network and a client program on each individual mobile unit. The server manages the access points, while the client manages the mobile units. In other embodiments, the mobile units themselves may manage the static key updates and transmission key index rotations. This approach may preferably be used for peer-to-peer communications where no server is available.

Existing hardware and software for both mobile units and access points typically support four static keys at the driver level. In a preferred embodiment, the present update and rotation scheme periodically changes the static key used for data transmissions by periodically rotating the transmission key index and concurrently updating one or more of the static keys with new keys either from a pre-computed key list or keys computed on demand from key seed information. In some embodiments, the access point management server and the mobile unit client programs synchronize the key update and rotation process, ensuring that communications are not disrupted at any time. In peer-to-peer communications, the mobile units coordinate key updates and transmission key index rotations among themselves.

In some embodiments, the encryption keys are computed on demand by the mobile unit and for the access points on the management server. In these embodiments a key generation or key seed file is distributed to the access point management server and the mobile units. The data in this file is used to generate new WEP keys in a synchronized manner in the mobile unit and access point management server.

In some other embodiments, a server pre-computes a list of keys. The list is then distributed to the mobile units and access point management servers. New keys for the static list are selected from the pre-computed key list for both the mobile units and the access points in a synchronized manner.

In some embodiments a staggered static key update and transmission key index rotation pattern is used for the encryption keys. This approach maximizes the probability that a mobile unit and an access point, or mobile units communicating on a peer-to-peer basis, are able to communicate even if there is some timing error between them. These embodiments seek to maximize the time between a key being added to a static key list and that key being used.

In some embodiments, the transmission key index of the mobile unit is rotated in a staggered or offset manner with respect to the rotation on the access point. Thus, the communicating entities use different transmission keys. This approach is preferably applied in cases where mobile units are communicating with access points. In cases where mobile units are communicating peer-to-peer the key used for transmission and reception is preferably the same. Thus, the keys on all mobile units in the association are preferably updated and rotated in a coordinated manner.

Most existing access points do not have the capability to manage static WEP key updates or transmission key index rotations. Rather, in some embodiments, a server using the Simple Network Management Protocol (SNMP), sets the WEP key values on the access point using specific Management Information Bases (MIBs). These embodiments therefore provide a server, on the wired network, to manage these changes. In some embodiments, client programs manage the static WEP key updates and transmission key index rotations on the mobile units. Updates of static WEP keys and rotation of transmission key indices are synchronized in time between the server managing the access points and the mobile units, preventing disruption of normal communications. Some embodiments prevent loss of synchronization between mobile units and access points in the event the mobile units are unable to communicate with the wireless network for an extended period of time. New key seed lists or pre-computed key lists are distributed in advance to access points and mobile units. A header in these key seed files or key list files indicates the valid start time and date for the list. When the mobile unit reconnects to the wireless network it uses the current time and date and the start date and time of the list to determine the current static encryption key set and transmission key index. Mobile units associating on a peer-to-peer basis can use the same synchronization schemes. If synchronization has been lost, the invention provides the capability to connect mobile units to the wired network and resynchronize the key seed lists or pre-computed key lists. In some embodiments, overlapping key lists are used to allow updates to be non-time-critical, since both the old and new key lists include keys that are valid during the period of overlap.

Overview of One Embodiment

Some embodiments manage static key sets and transmission key index choices on both access points and mobile units to improve the security of wireless local area networks. At the same time these embodiments provide the capabilities to manage static key lists and transmission key index choices for mobile units engaging in peer-to-peer associations. These embodiments pre-compute WEP key lists for distribution to the management servers and clients on mobile units, which update the static WEP keys and rotate the transmission key indices periodically in a time synchronized manner. A block diagram of one embodiment for static WEP key update and transmission key index rotation and the relationship of various entities in this embodiment is shown in FIG. 1. It will be understood that the entities shown in this diagram can be combined or distributed as required for any particular situation without changing the scope, functionality or spirit of the invention. It will also be understood that the system can operate on one or more wired and wireless sub-networks deployed in one or more geographic locations. The entities shown on the diagram can therefore be distributed between sub-networks in any manner advantageous to a particular deployment.

The automatic key generator 10 creates lists of pseudo-randomly generated encryption keys on a periodic basis. Typical list lengths may be 128, 256, 512, 1024, 2048, etc. Parameters used by the automatic key generator in some embodiments preferably include:

1. start time and date;
2. number of keys to generate;
3. key update and rotation interval or period; and,
4. pervious list of keys generated.

The pre-computed key lists are passed to the index and key scheduler 12, which adds any required header information. This may include:

1. the list of keys generated by the automatic key generator;
2. a start date and time for the key list, as determined by the index and key scheduler;
3. a time interval at which static keys are to be updated and the transmission key index rotated;
4. an indicator of the static key update and transmission key index update pattern to be used; and
5. a version indicator showing the version of the list.

The index and key scheduler periodically updates the key lists 16, 28 used in the AP index and key manager 14 and mobile units 26. The AP index key manager and the mobile units cycle through this shared list until it is once again updated by the index and key scheduler.

The index and key scheduler 12 passes the encryption key list 16 to the AP index and key manager 14. The AP index and key manager 14 creates sets of static keys and sets the transmission key index for the access points 22. Most access points are only capable of maintaining a list of four static keys at a time. When static key list updates and transmission key index changes are required, the AP index and key manager transmits a set of four static keys 24 drawn from the larger key list 16 to the access point and sets a transmission key index. In some alternative embodiments, the access points have sufficient memory and processing capability to store the entire key list 16. In this case, the functionality of the AP index and key manager may be subsumed into the access point and the updating of the static key list and rotation of the transmission key index may be performed locally on the access point 22. The master key list 16 and the static key list 24 are preferably stored in an encrypted form.

When a new master key list 16 is to be distributed, the index and key scheduler 12 passes the list to the MU index and key manager 20, which in turn passes the list to the mobile units 26, wherein the list is stored 28. The list is typically stored in encrypted form. The updating and use of the master key list is under control of the index and key control client 30. The master key list 16 can be transmitted to the mobile units over the wireless network or can be loaded by connecting the mobile unit to a device network interface 18. The device network interface connects the mobile unit to a wired network, where it can communicate directly with the MU index and key manager. The device network interface may comprise any suitable type of connection such as a cradle or a wire-based network interface card. In some alternative embodiments, the MU key and transmission key index list 28 is stored in the MU index and key manager 20, which then manages the updates to the static keys and sets the transmission index on the mobile unit 30. This alternative may be used in cases where the mobile unit does not have sufficient storage or processing capability. Regardless of the exact distribution and synchronization techniques used, the same methods may be applied to associations between mobile units and access points and peer-to-peer associations between mobile units.

The key lists 16, 28 may be generated and managed globally over one or more sub-networks or may be generated and managed for specific applications, networks or sub-networks. For example, all the sub-networks within a given geographic location may use the same list while those at other geographic locations use different lists. Alternatively, the key lists used may be specific to an application, role or profile of the mobile unit 26. In this case, the mobile unit 26 communicates with one or more specific access points 22 using the same specific key lists on one or more sub-networks. Examples of specific applications or roles include, warehouse inventory tracking terminals, payment terminals, or laptop computers used for a specific purpose, such as auditing. The same specific key lists may be used for associations between access points and mobile units, or peer-to-peer associations between mobile units sharing that list.

In some embodiments, any one, or all, of the automatic key generator 10, the index and key scheduler 12 and the AP index and key manager 14 can reside within one or more of the access points 22. Possible embodiments include the automatic key generator and index and key scheduler residing on one access point per sub-network and the AP index and key manager along with the key list 16 residing on each of the access points. Clearly, other combinations of distributing these functions between servers on the one or more sub-networks and the access points, may alternatively be implemented.

Overview of Alternative Embodiments

In some alternative embodiments, a file containing key generation information is distributed to the access point management server and the mobile units. New keys are generated upon demand and are used to update one or more of the static list of four active keys on the mobile unit or access point. The access point management server and a client on the mobile unit generate the required keys in a synchronized manner using the data in this file. This embodiment eliminates the need to pre-compute and distribute key lists 16, 24, as described above. These embodiments can be used for communications between access points and mobile units or for groups of mobile units engaging in peer-to-peer associations. These embodiments reduce storage requirements because they do not require a large key list and may improve security since no key information is stored on disk.

A block diagram illustrating such a preferred embodiment is shown in FIG. 2. It will be understood that the entities shown in this diagram can be combined or distributed as required for any particular situation without changing the scope, functionality or spirit of the invention. It will also be understood that the system can operate on one or more wired and wireless sub-networks deployed in one or more geographic locations. The entities shown on the diagram can therefore be distributed between sub-networks in any manner advantageous to a particular deployment.

As shown in FIG. 2, automatic key seed generator 200 generates one or more key seeds on a periodic basis. The key seed generator sends the key seeds to the index and key scheduler 202. The index and key scheduler creates the key generation files 204, 206 and transmits them to the AP index and key manager 14 and the MU index and key manager 20. The MU index and key manager propagates new lists to the mobile units 26. The key generation file may contain any suitable set of data for generating pseudorandom keys. Each file may contain one or more sets of key generation data. One suitable embodiment of this file would include the following items for the one or more data sets in the file:

1. the key seed, or base key, pseudorandomly generated by the automatic key seed generator;
2. a start date and time for the set of key generation data, as determined by the index and key scheduler;
3. a time interval at which static keys are to be updated and the transmission key index rotated;
4. a type code indicating, for example, the length of the key to be generated, which can have values of 40 or 128 bits for the WEP protocols;
5. a version indicator showing the version of the file;
6. an indicator of the static key update and transmission key index update pattern to be used; and
7. the version of the key generation code to be used.

At appropriate times the AP index and key manager 14 loads a new static key set 24 and transmission key index into the access points 14. At the same time the index and key control client 30 on the mobile unit 26 updates the static key set and transmission key index. Any suitable static key update and transmission key index rotation pattern can be used. Some suitable schemes are discussed below. The new keys are preferably computed in advance to prevent a time lag at the update time. The key generation algorithm employed by the index and key control client and the AP index and key manager may be of any suitable type. Two suitable algorithms include MD5 and Shaw. The inputs to these algorithms may be any suitable combination of data that produces a pseudorandom output. Data that may be used as input can include but are not limited to:

1. the key seed or base key;
2. the date and time;
3. the interval number for the static key update and transmission key index rotation algorithm;
4. a internal secret key or key seed stored within the AP index and key manager and index and key control client and possibly not known to network administrators; and
5. a shared secret key or seed, which may be periodically updated by network administrators.

New key generation files 204, 206 usually contain key generation data for use in one or more periods of time. The AP index and key manager 14 and the index and key control client 30 determine when to start using a new set of key generation data from the start date and time for that set, and will continue to use this set until a new set comes into effect. When a new file is distributed the AP index and key manager and index and key control client use the start date and time to determine when to start using keys generated with the data in the new file. The index and key scheduler 202 preferably distributes new key generation files well in advance of the start date and time. This scheme allows mobile units 26 which are unable to communicate with the access points 14 for a period of time to still generate the correct keys when reconnecting to the network. When a mobile unit reconnects to the network, the MU index and key manager 20 updates the key generation file 206 as required. If a mobile unit has been disconnected for a sufficient period of time that a new key generation file has come into effect, the mobile unit must connect to the wired network through the device network interface 18 to synchronize the key generation file with the MU index and key manager.

The key generation files 204, 206 can be generated and managed globally over one or more sub-networks or can be generated and managed for specific applications, networks or sub-networks. For example, all the sub-networks within a given geographic location can use the same key generation file while those at other geographic locations use different files. Alternatively, the key generation file used can be specific to an application, role or profile of the mobile unit 26. In this case, the mobile unit 26 communicates with one or more specific access points 22 using the same specific key generation file on one or more sub-networks. Examples of specific applications, roles or profiles include, warehouse terminal, payment terminal, laptop computer, and wireless PDA. The same specific key generation file can be used for associations between access points and mobile units, or peer-to-peer associations between mobile units sharing that list.

In some embodiments, any one, or all, of the automatic key seed generator 200, the index and key scheduler 202 and the AP index and key manager 14 can reside within one or more of the access points 22. Possible embodiments include the automatic key seed generator and index and key scheduler residing on one access point per sub-network and the AP index and key manager, along with the key generation file 204 residing on each of the access points. Other arrangements for distributing these functions between servers on the one or more sub-networks and the access points, may alternatively be implemented.

Key Update and Rotation Scheme

In some embodiments, both the mobile units 26 and the access points 22 maintain an active list of four static keys (e.g., 24) and use a single transmission key index, indicating which of the four keys is used to encrypt transmitted messages. At designated times, the transmission key index, which specifies the static key used to encrypt transmissions, is changed or rotated. At the same time, or at some other periodic interval, one or more of the static keys in the list of four are updated. The new keys may be computed on demand or taken from longer key lists, as described above. A number of suitable static key update and transmission key index rotation schemes can be applied. Two specific examples are shown below. It should be clear that many workable variations on these schemes are possible. For example, various permutations could be applied to the schemes presented, which would produce different key update and rotation patterns. These and other variations shall be considered to be within the scope and spirit of the invention.

FIG. 3 is a simplified diagram showing the static key updating and transmission key index rotation scheme used in some embodiments. Four static keys are shown for both an access point (e.g., 50, 54, 58, 62, 66) and a mobile unit (e.g., 52, 56, 60, 64, 68) for five time periods. Within each time period a dark arrow shows the active transmission key index; a circle indicates the static key entry being changed or updated. In some embodiments, the index and key control client 30 on the mobile unit 26 uses a transmission key index one ahead of that used by the AP index and manager 14. In the embodiment of FIG. 3, the mobile unit key control client 30 and the AP key and index manager 14 also update keys in the static key list of four in the mobile unit and the access point one ahead of the mobile unit transmission index. This scheme has an advantage that the mobile units and access points use different transmission indices improving security. In addition, the offset of the key updates from the transmission indices allows considerable error in the timing of changing the indices while still maintaining communications. Using this scheme, the clocks of the mobile units and access points can be out of sync by up to one half the update period without interrupting communications.

Referring to FIG. 3, in time period 1, the key index for the access point 22 is pointing to key A in the key list 50. The key list 52 in the mobile unit 26 is nearly the same except that the transmission key index points to key B. In time period 1, the access point key list 50 and the mobile unit key list 52 have at least three keys in common, even if time synchronization is imperfect, and thus could use any of these keys to communicate in either direction.

At the start of time period 2, the AP index and key manager 14 updates the static keys 54 on the access point 22, advancing the transmission key index by one to key B. At the same time, or at some other periodic interval, the fourth key is updated to key E. Meanwhile, the index and key control client 30 on the mobile unit 26 advances the transmission key index to key C and the fourth key is updated to key E. In time period 2, the access point key list 54 and the mobile unit key list 56 still have at least three keys in common, even if time synchronization is imperfect, and thus could use any of these keys to communicate in either direction.

The same procedure is applied at the beginning of time periods 3, 4 and 5. By time period 5 all keys in the access point static key list 66 and the mobile unit static key list 68 have been changed with respect to the original static key lists (50, 52). It can be seen that within each time period the access point and the mobile unit have at least three keys in common, even if time synchronization is imperfect. Thus, if the time period transitions employed by the index and key control client 30 on the mobile unit 26 are not perfectly synchronized with the transition times employed by the AP index and key manager 14, the mobile unit and the access point may continue to communicate without interruption since the AP and MU are each using a transmission key that remains on the other entity's static key list.

In some alternative embodiments, the same transmission key index can be used for two or more entities, e.g., access point 22 and mobile unit 26. These embodiments are suitable for communications between access point and mobile units or for peer-to-peer associations between mobile units. The use of the same transmission and reception key simplifies key synchronization between a plurality of mobile units creating a peer-to-peer association. At the same time, or at some other periodic interval, one or more of the static keys in the list of four are changed. The new keys, can be computed on demand or are taken from longer key lists 16, 28 for access points and the mobile units.

FIG. 4 is a simplified diagram showing the static key update and transmission key index rotation scheme used in some embodiments. The four static keys are shown for both the access point (80, 84, 88, 92, 96) and the mobile unit (82, 86, 90, 94, 98) for five time periods. Within each time period a dark arrow shows the active transmission key index; a circle indicates the static key entry being changed or updated. The index and key control client 30 on the mobile unit 26 uses the same transmission key index as that used by the AP index and manager 14. In the embodiment of FIG. 4, the mobile unit key control client 30 the AP index and key manager 14 also update keys in the static key list of four in the mobile unit two ahead of the transmission index. This scheme is well suited to situations where the mobile units are creating peer-to-peer associations since the transmission key indexes are the same for all transmitting entities. In such cases the mobile units follow the static key updating and transmission key index rotation scheme shown in FIG. 4, with or without an access point. The offset of the key updates from the transmission indices allows considerable error in the timing of changing the indices while still maintaining communications. Using this scheme, the clocks of two communicating entities may be out of sync by up to one and one half the update period without interrupting communications.

Referring to FIG. 4, in time period 1, the key index for the access point 22 and mobile unit 26 is pointing to key A in the key list 80, 82. In time period 1, the access point key list 50 and the mobile unit key list 52 have at least three keys in common, even if time synchronization is imperfect, thus could use any of these key to communicate in either direction.

At the start of time period 2, the AP index and key manager 14 updates the static keys 54 on the access point 22, and the key control client 30 updates the keys on the mobile unit 26, advancing the transmission key index by one to key B. At the same time, or at some other periodic interval, the fourth key is updated to key E. In time period 2, the access point key list 84 and the mobile unit key list 86 still have at least three keys in common, even if time synchronization is imperfect, and thus could use any of these key to communicate in either direction.

The same procedure is applied at the beginning of time periods 3, 4 and 5. By time period 5 all keys in the access point static key list 96 and the mobile unit static key list 98 have been changed with respect to the original static key lists (80, 82). It can be seen that within each time period the access point and the mobile unit have three keys in common, even if time synchronization is imperfect. Thus, if the time period transitions employed by the index and key control client 30 on the mobile unit 26 are not perfectly synchronized with the transition times employed by the AP index and key manager 14, the mobile unit and the access point may continue to communicate without interruption since the AP and MU are each using a transmission key that remains in the other entity's static key list. In yet another alternative embodiment, transmission key index rotation is applied to only the list of four static keys (e.g., 24) on the access points 22 and mobile units 26. In this embodiment, the key lists and key generation files described above are not utilized. This reduces data storage requirements, processing requirements and network data transfer requirements at the possible expense of decreased security.

Synchronization

The set of four static keys (e.g. 24) is periodically updated and the transmission key index is periodically rotated in a synchronized manner on both mobile units 26 and access points 22. Two possible static key updating and transmission key index rotation schemes have already been described in the previous section. The index and key scheduler 12, 202 preferably determine the timing of static key updates and transmission key index rotations in advance. In some embodiments, the static key updates and transmission key index rotations for the access points are managed by the AP index and key manager 16 and on mobile units by the index and key control client 30. Any suitable updating and rotation schedule may be applied including updating and rotating:
 1. at specific times and dates (i.e., every night at midnight);
 2. at regular time intervals from some start time (i.e., every four hours); and
 3. a certain number of times during a period of time (i.e., four times per day).

The static key updating and transmission key index rotation periods used by the AP index and key manager 14 and index and key control client 30 are preferably synchronized. In some embodiments, the index and key scheduler 12, the MU index and key manager 20, or some other network service maintains a master time. The AP index and key manager and the index and key control clients determine a time offset between the clocks they are using and the one maintained by the index and key scheduler through the exchange of time synchronization messages or time stamps on other messages. Time offsets may be computed at initialization or boot-up and updated on a periodic basis. It should be noted that use of time stamps on messages avoids the need to actually synchronize multiple clocks over one or more wired and wireless networks.

List Updates

In some embodiments, the index and key scheduler 12 periodically creates new master key lists 16, 18 for the AP index and key manager 14 and the index and key control client 30 on the mobile units 26. In some other embodiments, the index and key scheduler 202 creates new key generation files 204, 206, for the AP index and key manager and index and key control client. Generally, the master key lists and key generation files include a header, indicating a time period for which they are valid. The master key list or key generation file is preferably distributed in advance to prevent the loss of synchronization between mobile units and access points or mobile units associating on a peer-to-peer basis.

In some embodiments, some portion of the master key list 16, 28 (say one fourth of the list) is identical to a portion of the old list. In this way, the AP index and key manager 14 and index and key control client 30 can start using the new list immediately upon receipt while maintaining synchronization with keys used in the rest of the wireless network. Further, this scheme allows mobile units 26 that have been off the network for a period of time to determine the current static key set for a significant period of time following the distribution of a new list. For example, if the key list has a length of 512, the update and rotation period is one hour, and the overlap is one fourth of the list (i.e., 128 time periods of list overlap), then the mobile unit can disconnect from the wireless network for approximately 128 hours and still retain synchronization, even if a new key list is distributed.

Access Point Management

In some embodiments, the AP index and key manager 14 manages the active static key list 24 using a pre-computed master key list 16, and at the same time, manages the selection of the transmission key index on the access points 22. In these embodiments, the static key list on the access point is updated from the pre-computed list. In some other embodiments, the AP index and key manager 14 manages the active static key list 24 using a key generation file 204, and at the same time, manages the selection of the transmission key index on the access points 22. In these embodiments, the static key set on the access point is updated by computing new keys on demand using the information in the file.

A simplified state diagram for an embodiment of an AP index and key manager is shown in FIG. 5. In will be understood that in alternative embodiments a different state diagram design may be used without changing scope, spirit or functionality.

On power-up or other startup events, the access point 22 initializes 100. The index and key manager 14 periodically searches the wired network for newly initialized access points 102 using a discovery process. Once the access point is discovered, the AP index and key manager communicates with the access point 104, typically via the SNMP protocol. Once communications are established, the AP index and key manager transfers the static key list and transmission key index 106 and sets these values in the access point 108. Once the index and keys are set, the AP starts regular communications 110 and communicates 112 with the one or more mobile units 26.

When the AP index and key manager 14 determines it is time to update the static key list 24 and rotate the transmission key index 114, the new index and keys are transmitted to and set 118 in the access point 22. Once the index is rotated and static keys are updated 116 the access point resumes communication 112 with the one or more mobile units 26. In some cases the MU index and key manager will reset and reinitialize the access point to force the new key set and index to take effect.

In some embodiments, the AP index and key manager 14 periodically receives 122 a new master key list 16 from the index and key scheduler 12 and the key list is updated 120. In some other embodiments, the AP index and key manager 14 periodically receives 122 a new key generation file 204 from the index and key scheduler 12 and the file is updated 120. The AP index and key manager determines the current transmission key index 124 and loads the new keys and index (if any) 118 into the access point 22, which updates the static key list and transmission key index 116 and resumes communications 112 with the one or more mobile units 26.

Mobile Unit Management

In some embodiments, the index and key control client 30 manages the static key list and transmission key index on the mobile unit 26. In some embodiments, the static key list is updated using a pre-computed list of keys 28. In some other embodiments, the static key list is updated using keys computed on demand from information in the key generation file 206.

A simplified state diagram for an embodiment of an index and key control client is shown in FIG. 6. The same state diagram may apply to mobile units associating with access points 14 or creating peer-to-peer associations. In will be understood that in alternative embodiments a different state diagram design may be used without changing scope, spirit or functionality.

On power-up or other startup event the mobile unit 26 initializes 150. Once initialized the mobile unit starts 152 the index and key control client 30. The index and key control client then determines the current static key set and transmission key index 154. In some embodiments, the static keys are selected from a master key list 28. In some other embodiments, the static keys are computed on demand using information in the key generation file 206. Once the static key list is updated and transmission key index is rotated 158, the index and key control client searches for and connects to 162 the MU index and key manager 20. Once the initialization is complete the mobile unit starts regular communications 163 and with one of the multiple possible access points 170 or with other mobile units in a peer-to-peer association. If the index and key control client 30 cannot determine the correct index 156, it then searches for the correct index 168. This condition will typically occur when there is a timing or synchronization problem between the mobile unit and the rest of the network. Those skilled in the art will be familiar with multiple optimized list search strategies suitable for this purpose. In some other embodiments, the mobile unit clock must be reset at initialization. In these cases, the mobile unit may have its clock synchronized using any suitable method including:

1. A user enters the approximate time manually into the mobile unit 22; and
2. The mobile unit 22 is connected to device network interface 18 to synchronize the time.

Once the mobile unit 22 has successfully synchronized, the index and key control client searches for 164 and connects to 162 the MU index and key manager 20. In peer-to-peer associations this step may be skipped. The mobile unit 26 then starts regular communications 163 with the one of the one or more access points 170, or with other mobile units in a peer-to-peer association. When the index and key control client 30 determines it is time to update the static key list and rotate the transmission key index 178, the static key list is updated and the transmission key index is rotated 190. Once the index is rotated and static key list is updated 178, the mobile unit 26 resumes communication 170.

In some embodiments, the MU index and key manager 20 transmits a new master key list 28 to the index and key control client 30 on the mobile unit 26. The index and key control client updates the key list 184. In some other embodiments, the MU index and key control manager transmits a new key generation file 206 to the key control client on the mobile unit. In either case, the index and key control client determines the current static key list and transmission key index 186 and loads the new static keys and transmission index (if any) 190. The controller then updates the static keys and rotates the transmission key index 180 and resumes communications 170.

If during the loading of the static key set and transmission key index 190, the index and key control client 30 cannot determine the correct index (or key update and rotation time period) 176, it searches for the correct index 168. This condition will typically occur when there is a timing or synchronization problem between the mobile unit and the rest of the network. Those skilled in the art will be familiar with multiple optimized list search strategies suitable for this purpose. If the search is successful, the index and key control client updates the static key set and transmission index 166, and the mobile unit 26 resumes communications 170. The failure of synchronization generally occurs when the mobile unit 26 has been disconnected from the wireless network for an extended period of time and either its clock has lost synchronization, the clock has been reset, or the index and key scheduler 12, 202 has distributed a new key list 28, 206 and the old key information has expired. In these cases, key index and control client 30 cannot successfully complete a search 168 for the correct key update and rotation interval 172, and the mobile unit 26 is preferably connected to the device network interface 18. Once connected, the MU index and key manager 20 synchronizes 174 the key list 28 or key generation file 206 in the mobile unit 26. If required, the mobile unit time offset is updated. The index and key control client then determines the current static key set and transmission key index 192 and loads the new keys and index (if any) 190. The client then updates the static key set and rotates the transmission key index 180 and resumes communications 170.

While the invention has been described in conjunction with specific embodiments, it is evident that numerous alternatives, modifications, and variations will be apparent to those skilled in the art in light of the foregoing description.

We claim:

1. A system for improved security for wireless local area networks, and comprised of: a wireless local area network conforming to the IEEE 802.11 family of specifications, the wireless local area network providing wireless communications links for the transmission of data between the two or more communicating entities; one or more generators for creating pseudorandom WEP encryption keys for the communicating entities; and one or more controllers for synchronously selecting a transmission encryption key index for each communicating entity on a rotating basis from one or more sets of active WEP keys, and updating the one or more sets of active WEP keys.

2. The system of claim 1, wherein the communicating entities comprise: one or more access points associating with one or more wired sub-networks; and one or more mobile units.

3. The system of claim 1, wherein the communicating entities comprise two or more mobile units associating on a peer-to-peer basis.

4. The system of claim 2, wherein the encryption keys are generated for and synchronized between one or more access points and one or more mobile units engaged in associations.

5. The system of claim 3, wherein the encryption keys are generated for and synchronized between two or more mobile units engaging in peer-to-peer associations.

6. The system of claim 1, wherein the controller selecting the active encryption keys for the one or more mobile units is on the mobile units.

7. The system of claim 1, wherein the controller selecting the active encryption keys for the one or more access points is on one or more servers on the one or more sub-networks.

8. The system of claim 1, wherein the controller selecting the active encryption keys for the one or more access points is on the access points.

9. The system of claim 1, wherein a server generates a list of two or more encryption keys, which are distributed to the two or more communicating entities.

10. The system of claim 9, wherein the active keys for the transmitting entities are selected from the list by the controllers in a staggered pattern, so that the encryption keys are different in each transmission direction, and where errors in time synchronization of up to one half of a key change time interval do not disrupt regular communications.

11. The system of claim 1, wherein a server generates key generation information, which is distributed to the two or more communicating entities.

12. The system of claim 11, wherein the active keys for the communicating entities are selected by the one or more controllers in a staggered pattern, so that the encryption keys are different in each transmission direction, and where errors in time synchronization of up to one half key change time interval do not disrupt regular communications.

13. The system of claim 1, wherein the encryption key updates for the communicating entities are performed at specific dates and times.

14. The system of claim 1, wherein the encryption key updates for the communicating entities are performed at regular time intervals.

15. The system of claim 1, wherein the one or more controllers use time offsets to synchronize the key updates in time between the communicating entities.

16. The system of claim 1, wherein a mobile unit reconnecting to the wireless network can determine the correct encryption keys to use based on the time.

17. The system of claim 1, wherein a mobile unit reconnecting to the wireless network and unable to synchronize encryption keys is adapted to perform a systematic search for the correct keys based on a key update and rotation algorithm.

18. The system of claim 1, wherein a mobile unit that has lost synchronization with the changes in encryption keys is adapted to connect to a wired network to regain synchronization.

19. A method for providing improved security for wireless local area networks, comprising: creating pseudorandom WEP encryption keys for a plurality of communicating entities adapted to communicate via a wireless local area network conforming to the IEEE 802.11 family of specifications; synchronously selecting a transmission encryption key index for each communicating entity on a rotating basis from one or more sets of active WEP keys; and synchronously updating the one or more sets of active WEP keys.

* * * * *